(12) United States Patent
Van Mullekom et al.

(10) Patent No.: US 7,192,222 B2
(45) Date of Patent: Mar. 20, 2007

(54) METHOD OF USE OF A PNEUMATIC CONVEYING APPARATUS FOR CONVEYING GLASS FIBRES WITH SPECIFIC PROPERTIES

(75) Inventors: Robert Hubertus Van Mullekom, Lokeren (BE); Detlev Joachimi, Krefeld (DE); Matthias Bienmüller, Krefeld (DE); Herbert Grasshoff, Moers (DE); Maarten De Bock, Kallo (BE)

(73) Assignee: Lanxess Deutschland GmbH, Leverkusen (DE)

( * ) Notice: Subject to any disclaimer, the term of this patent is extended or adjusted under 35 U.S.C. 154(b) by 12 days.

(21) Appl. No.: 11/128,792

(22) Filed: May 13, 2005

(65) Prior Publication Data

US 2005/0265793 A1 Dec. 1, 2005

(51) Int. Cl.
*B65G 53/00* (2006.01)

(52) U.S. Cl. .................. 406/197; 406/95; 406/151

(58) Field of Classification Search ............. 406/197, 406/95, 151
See application file for complete search history.

(56) References Cited

U.S. PATENT DOCUMENTS

| | | | | |
|---|---|---|---|---|
| 3,996,032 | A * | 12/1976 | McWilliams et al. | 65/480 |
| 6,199,778 | B1 * | 3/2001 | Hanvey, Jr. | 241/19 |
| 6,365,272 | B1 * | 4/2002 | Masson et al. | 428/378 |
| 6,786,681 | B2 * | 9/2004 | Grasshoff | 406/11 |

FOREIGN PATENT DOCUMENTS

EP    0 692 441 B1    7/1994

* cited by examiner

*Primary Examiner*—Joe Dillon, Jr.
(74) *Attorney, Agent, or Firm*—Nicanor A. Kohncke

(57) ABSTRACT

The invention describes a method of use of a conveying apparatus for the pneumatic conveyance of sized glass fibers, the sized glass fibers having a size extractability of at most 85%, preferably at most 50% and with particular preference at most 40%.

4 Claims, 1 Drawing Sheet

Figure 1:
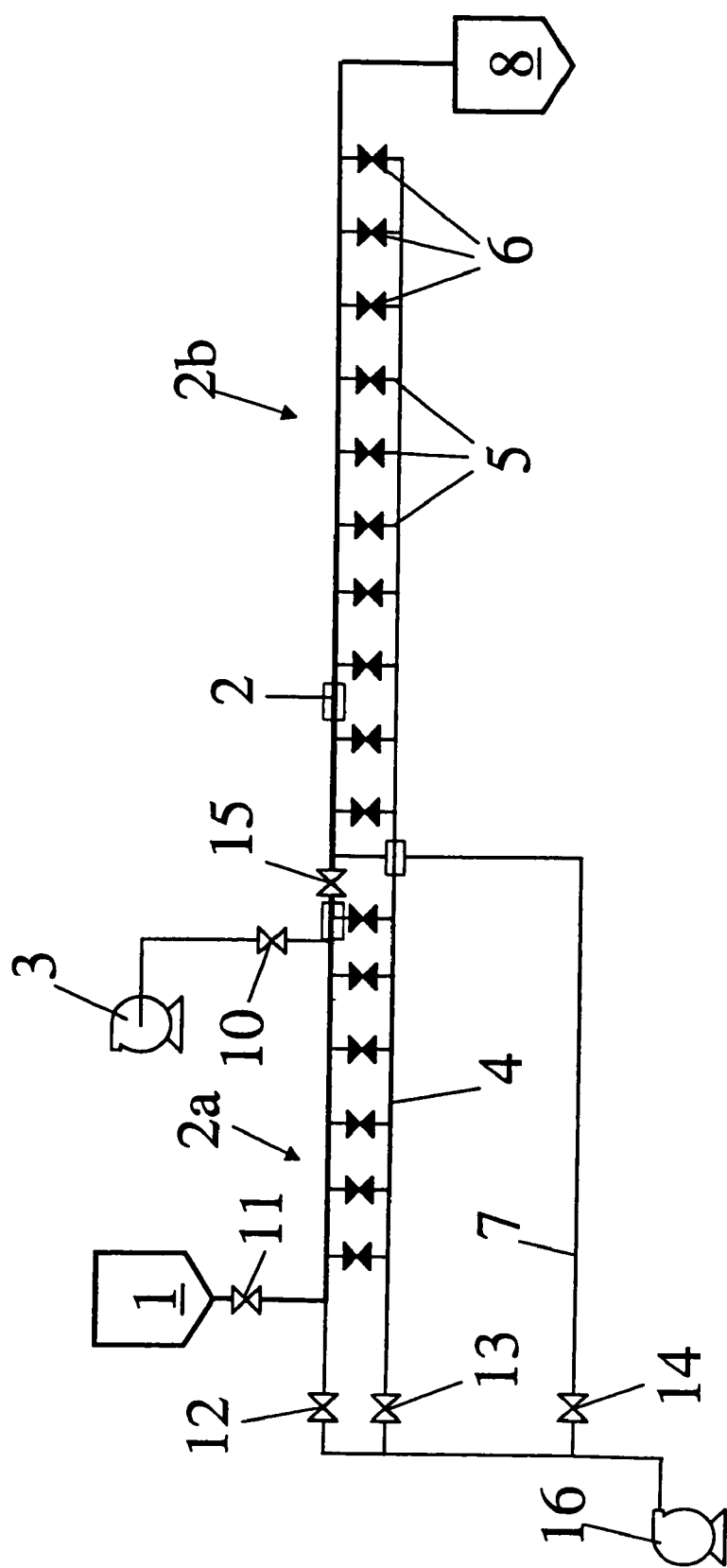

METHOD OF USE OF A PNEUMATIC CONVEYING APPARATUS FOR CONVEYING GLASS FIBRES WITH SPECIFIC PROPERTIES

The invention relates to a method of use of a pneumatic conveying apparatus according to DE 101 27 427 A1 (U.S. Pat. No. 6,786,681) for conveying glass fibres which have a size extractability of at most 85%.

Glass fibres for the reinforcement of plastics are usually processed in the form of fibre strands, known as chopped strands. The fibre strands consist for example of 2000 parallel individual fibres (typical diameter of the individual fibres 10 to 14 μm) with a typical length of 3 to 4.5 mm. The glass fibres are coated with what is known as a size, the size content of the ready-for-sale chopped strands generally being 0.3 to 1.5% by weight.

One of the purposes of the glass fibre size is to establish the bond between the glass fibre and the matrix polymer. Compositions comprising a polymeric binder (known as the film former), a coupling agent, lubricants, antistatic agents and further auxiliaries are generally used as sizes. Organic, water-dispersible or soluble polyvinyl acetate, polyester, polyester epoxy, polyurethane, polyacrylate or polyolefin resins or mixtures thereof are generally used as binders. The size is generally applied as an aqueous dispersion and/or solution during the production of the glass fibres. Subsequently, the glass fibres provided with a size are dried. The components of the size are generally chosen such that there is an affinity between the polymer matrix and the size and consequently a mechanical bond is established between the glass fibre and the polymer matrix.

In addition, the size is intended to ensure the suitability of the glass fibres for production and processing. The size holds together the dry individual fibres in the fibre strands, in order that they do not fluff up during transport, conveyance and processing, i.e. alter their consistency to a form similar to cotton wool by the fibrous bond disintegrating. Excessive fluffing up of the glass fibres considerably increases the risk of blockages in the glass fibre processing installations (for example extruder feed, pipes, hoppers, conveyor belts, balances).

Conveying equipment known from the prior art for the discontinuous charging/filling of production plants with chopped glass fibres comprises elevator installations and industrial trucks, such as forklifts or crane systems. Continuous conveyance can be performed for example by means of bucket elevators, steady-flow conveyors, shaking or vibrating chutes or conveyor belts.

It is disadvantageous that this conveying equipment is in some cases very sophisticated and, on account of the way in which it is constructed and the space it takes up, can only be integrated with difficulty in already existing production plants and the logistics of their buildings.

The use of installations such as are described for example in EP 0 692 441 A1 for the pneumatic conveyance of bulk materials provides a way of resolving this. The pneumatic conveying installations described in EP 0 692 441 A1 operate in what are known as suction-pressure cycles, the installation being partly filled with bulk material from a charging container in the suction cycle and the material with which it is filled being conveyed to the intended destination in the pressure cycle. A special arrangement of the compressed air supply prevents such installations from becoming blocked.

In German Offenlegungsschrift DE 101 27 427 A1 there is a description of an apparatus for pneumatic conveyance of fine-particled bulk materials, in particular glass fibres, which has at least one charging container, a pneumatic conveying pipe with a first portion and a second portion, a suction conveying device for the conveying gas, which is connected to the end of the first portion of the conveying pipe, a pressure conveying device for the conveying gas, a supplementary conveying gas line, a number of shut-off valves between the pneumatic conveying pipe and the supplementary conveying gas line and also a discharging point.

By contrast with the apparatus described in EP 0 692 441 A1, the apparatus described in DE 101 27 427 A1 does not have the disadvantage that it is necessary in the suction or filling phase of the conveying cycle for negative pressure to be generated at the intended destination throughout the entire apparatus, but only in the first portion of the conveying pipe. A further advantage of the apparatus described in DE 101 27 427 A1 is the more efficient operation of the conveying installation, because the first phase (filling portion 1 with the glass fibres) and the third phase of the conveying cycle (conveying the glass fibres into portion 2) can take place simultaneously. Furthermore, in the case of the apparatus known from DE 101 27 427 A1, the conveying rate can be controlled better.

A considerable disadvantage of pneumatic glass fibre conveying installations is, however, the high mechanical stress to which the glass fibre strands are subjected. Under high mechanical loads of this type, it depends essentially on the glass fibre size whether the glass fibres of a glass fibre strand hold together adequately well. If the glass fibres of a strand hold together only inadequately on account of the size, the specific volume of the conveyed glass fibres increases greatly during their conveyance.

A great increase in volume is an indication of the formation of fluff, which on the one hand can lead to blocking of the installation and on the other hand makes further processing of the glass fibres more difficult. Consequently, there is the risk of the advantage that is aimed for with the apparatus for pneumatic conveyance according to DE 101 27 427 A1 being partly negated again by considerable disadvantages in the subsequent metering by means of balances, downpipes, conveyor belts and extruders.

An important factor for the production of fluff during pneumatic conveyance is the reduction in the specific weight (apparent density) of the glass fibres during the conveying operation. This means an increase in the specific volume. The increase in specific volume should generally not exceed 10% to permit further processing of the glass fibres after the pneumatic conveyance.

It has now surprisingly been found that glass fibres with a size extractability of at most 85%, preferably at most 50%, and with particularly preference at most 40%, are transported particularly well by an apparatus according to DE 101 27 427 A1.

Size extractability of sized glass fibres is understood for the purposes of the present invention as meaning the weight of soluble constituents obtained after stirring 1 part by weight of sized glass fibres for 24 hours in a solvent mixture of 1.13 parts by weight of methanol and 21.3 parts by weight of chloroform at reflux temperature (under normal pressure), expressed in percent of the total amount of size by weight present on the sized glass fibres before extraction.

Within the present invention, the pneumatic conveyance of glass fibres is understood as meaning the transporting of glass fibres by means of a gas stream according to DE 101 27 427 A1, the gas stream (generally an air stream) entraining the glass fibres and conveying them in this way. The transporting of the glass fibres generally takes place in pipes, tubes or the like in which the gas stream is generated by the build-up of a difference in pressure.

The pneumatic conveyance of glass fibres may be used for example for the filling and emptying of transporting containers for glass fibres (for example bags, Oktabin containers, stationary silos, truck-mounted silos), for transporting within the production plant for glass fibres and for transporting in installations for incorporating the glass fibres in plastics.

Since the glass fibre size plays a decisive part in the conveying behaviour of the glass fibres, a person skilled in the art would expect that, within the customary range for the size content of chopped glass fibres, i.e. 0.3 to 1.5% by weight, a higher size content should lead to improved conveying behaviour.

However, it has surprisingly been found that it is not the size content that is of decisive influence on the conveying behaviour but rather that the conveying behaviour improves with decreasing extractability of the size in an organic solvent mixture.

The determination of the size extractability is carried out as follows: 1 part by weight of glass fibres is stirred with 1.13 parts by weight of methanol and 21.3 parts by weight of chloroform for 24 hours at reflux temperature under normal pressure. Subsequently, the suspension produced is filtered and the filtrate is evaporated to dryness. The amount by weight of size is determined by weighing the dry residue of the filtrate. The entire amount by weight of size present on the sized glass fibres before the extraction is determined by means of ashing in accordance with ISO 3451. The size extractability is then calculated as follows:

Size extractability=(amount by weight of extracted size per part by weight of glass fibres)/(amount by weight of size before the extraction per part by weight of glass fibres)*100%

Chopped, sized glass fibres for the reinforcement of plastics are offered on the market by various manufacturers. Vetrotex 983 from Vetrotex, Chambéry, France; PPG 3660 and PPG 3786 from Pittsburgh Plate Glass, Pittsburgh, Pa., USA; and CS 7928 from Bayer, Leverkusen, Germany may be mentioned by way of example.

Use of the apparatus according to DE 101 27 427 A1 for the pneumatic conveyance of glass fibres with a size extractability of at most 85% has the advantage that, during the conveyance, the specific volume of the glass fibres increases by at most 10%. On the one hand, this means a significantly lower risk of blockage of the pneumatic conveying installation itself, on the other hand the further processability of the glass fibres after the pneumatic conveying step is ensured. This results in safe and trouble-free operation of the installation.

The content of DE 101 27 427 A1 is fully incorporated by the present application.

DE 101 27 427 A1 describes a method for the pneumatic conveyance of fine-particled bulk materials using an apparatus which has at least one charging container, a pneumatic conveying pipe with a first portion and a second portion, a suction conveying device for the conveying gas, a supplementary conveying gas line, a number of shut-off valves between the pneumatic conveying pipe and the supplementary conveying gas line and also a discharging point, characterized in that a) in a first step, the first portion of the conveying pipe is filled with the charged portion of the conveyed material and conveying gas from a charging container by means of suction conveyance, b) in a second step, the conveyed material is conveyed from the first portion of the conveying pipe by means of pressure conveyance into the second portion of the conveying pipe and by means of pressure conveyance to the discharging point, The supplementary conveying gas line being closed or closable at the end and the pressure conveyance in the second portion of the conveying pipe being operated with a constant amount of conveying gas for the conveying pipe and the supplementary conveying gas line.

In a preferred embodiment, DE 101 27 427 A1 describes a method as described above in which, in addition, the occurrence of blockages at the points of the conveying tube where there is a tendency to block is prevented by means of an increased number of shut-off valves, in that the shut-off valves installed at these points open when a pressure loss occurs and introduce conveying gas into the region of the incipient blockage.

In a particularly preferred embodiment, DE 101 27 427 A1 describes a method as described above which is characterized in that shut-off valves of a two-stage design are used, the first stage, which is connected to the conveying pipe, ensuring a nonreturn effect and closing when the pressure in the pneumatic conveying pipe is equal to or greater than the pressure in the supplementary conveying gas line.

With particular preference, DE 101 27 427 A1 describes a method as described above which is additionally characterized in that shut-off valves of a two-stage design are used, the second stage, which is connected to the supplementary conveying gas line, being formed as an inlet valve with pressure presetting for the conveying gas from the supplementary conveying gas line, a pressure which is greater than the pressure at the connection point being preset in the conveying pipe when the conveying pipe is operating free from blockage. In particular, DE 101 27 427 A1 describes with particular preference a method as described above in which, in addition, the pressure in the second stage of the shut-off valves, seen in the conveying direction, is preset to increase from valve to valve.

The apparatus according to DE 101 27 427 A1 for the pneumatic conveyance of glass fibres is described in more detail below on the basis of the accompanying drawings, in which:

FIG. 1 shows a schematic representation of an embodiment of an apparatus for the pneumatic conveyance of glass fibres according to DE 101 27 427 A.

This comprises at least (i) a conveying pipe (2) with a shut-off device (15), which subdivides the conveying pipe (2) into a first portion (2a) between a first end of the conveying pipe (2) and the shut-off device (15) and a second portion (2b) between the shut-off device (15) and the second end of the conveying pipe (2), (ii) a charging device (1), which is connected to a first end of a conveying pipe (2) via a shut-off device (11), (iii) a discharging device (8), which is connected to the second end of the conveying pipe (2), (iv) a supplementary conveying gas line (4) connected in parallel with the conveying pipe (2), the supplementary conveying gas line (4) being connected to the conveying pipe (2) by a multiplicity of connecting lines (5), (v) a suction conveying device (3), which is connected in a way allowing it to be shut off to the first portion (2a) by means of a shut-off device (10), (vi) a pressure conveying device (16), which is connected in a way allowing it to be shut off in the region of the first end of the conveying pipe (2) by means of a shut-off device (12) and to the supplementary conveying gas line (4) by means of a shut-off device (13) and to the first end of the portion (2b) by means of a shut off device (14), and (vii) shut-off devices (6) in the connecting lines (5).

As described in DE 101 27 427 A1, the shut-off devices (6) are designed in such a way that, in the case of incipient blockages or blockages occurring, the shut-off valves (6), which are connected to the supplementary conveying gas line (4) via short pieces of pipe (5), open. As a result, the conveyance of the charged portion of the chopped glass fibres is maintained downstream of the incipient blockage or the blockage occurring and, if applicable, the blockage is loosened.

The apparatus shown in FIG. 1 is operated by a method which comprises the following steps (all cocks, i.e. shut-off devices, are closed in the initial state):

(a) opening of the shut-off devices (11), (10) and (13)

(b) sucking of glass fibres out of the charging device (1) into the first portion (2a) by means of the suction conveying device (3)

(c) closing of the shut-off devices (11) and (10)

(d) opening of the shut-off devices (12) and (15)

(e) conveying of the glass fibres sucked into the first portion (2a) in step (b) into the second portion (2b) by means of the pressure conveying device (16)

(f) closing of the shut-off devices (12) and (15)

(g) opening of the shut off device (14)

(h) conveying of the glass fibres conveyed into the second portion (2b) in step (e) to the charging container (8) by means of pressure conveyance (16)

(i) closing of the shut-off device (14).

With the glass fibres with the required size extractability, the method in DE 101 27 427 A1 can be performed once or more than once. If it is performed more than once, step (i) is directly followed by step (a), so that the steps (a) to (i) are run through cyclically. Preferably, the steps (g), and (h) and (i) (conveying into portion 2b) and (a), (b) and (c) (filling of portion 2a) are operated simultaneously. After step (f), the steps (a), (b) and (c) then follow already while the steps (g), (h) and (i) are being performed.

An additional advantage of the pneumatic conveying installation according to DE 101 27 427 A1 is the possibility of charging it with glass fibres which are supplied by bulk transport. Bulk transport is understood as meaning the provision of glass fibres from bulk material containers, the bulk material containers being distinguished by the fact that on the one hand they are mobile (for example transport by truck or train) and on the other hand they accept an amount of glass fibres greater than 1.5 tonnes per container, with preference greater than 7 tonnes per container and with particular preference greater than 15 tonnes per container. Such bulk material containers are, for example, bulk material containers which are delivered by truck to the pneumatic conveying installation and transported away after emptying.

Bulk transport provides economic and logistical advantages in particular, arising because bulk transport allows comparatively large amounts of glass fibres per unit to be provided for pneumatic conveying installations. The comparatively large amount of glass fibres provided in the case of bulk transport also offers the advantage that it is possible to dispense with operations for transferring the glass fibres, which means there is less mechanical stress on the glass fibre strands.

In a preferred embodiment, the conveying apparatus according to DE 101 27 427 A1 is charged with sized glass fibres which have a size extractability of at most 85% and are transported in bulk before the pneumatic conveyance. The bulk transport takes place in particular by means of bulk material containers of at least 1.5 t, with preference at least 7 t, with particular preference at least 15 t.

It will be understood that the specification and examples are illustrative but not limitative of the present invention and that other embodiments within the spirit and scope of the invention will suggest themselves to those skilled in the art.

EXAMPLES

Example 1

The content of size is determined in % by weight for 4 different types of glass fibres (Examples 1(a)–(d)) by means of ashing in accordance with ISO 3451. The results are shown in Table 1, column 3.

In addition, the proportion of size that can be extracted from these glass fibres with chloroform/methanol is determined in the following way. The following are brought together in a 4 l flask having a plane-ground joint with a reflux condenser and a mechanical stirrer:

glass fibres according to Table 1: 175 g
chloroform p.a.: 3725 g
methanol p.a.: 197.5 g The mixture is heated to reflux for 24 hours while stirring. Subsequently, the glass fibres are filtered off and the filtrate evaporated. The weight of the samples obtained in this way is determined in % by weight of the total weight of the glass fibres and the proportion of extracted size calculated in %. The results are likewise shown in Table 1), columns 4 and 5).

TABLE 1

| Example | Glass fibre | % by weight of size (ISO 3451) | % by weight of extracted size (CHCl₃/methanol) | % by weight of extracted size/% by weight of size [%] |
|---|---|---|---|---|
| 1a | PPG 3660 | 0.7 | 0.30 | 43 |
| 1b | Vetrotex 983 | 0.7 | 0.17 | 24 |
| 1c | PPG 3786 | 0.7 | 0.63 | 90 |
| 1d | Bayer CS7928 | 0.8 | 0.31 | 39 |

Example 2

The glass fibres described in Example 1 are investigated and assessed with regard to conveying behaviour in practical conveying tests with a pneumatic conveying installation according to FIG. 2 (Exemplary embodiments 2 (a), (b) and (d); Comparative example 2 (c)).

The overall length of the pneumatic conveying pipe between the charging point and the discharging point is 120 m. The chopped glass fibres to be conveyed are located in the charging container 1. From this charging container 1, a sample of glass fibres is taken to determine the bulk volume before conveyance.

All the valves are closed. In a first step, the valves 10 and 11 are opened and a portion of about 150 kg of the chopped glass fibres is sucked out of the charging container 1 into the first portion 2a of the pneumatic conveying pipe 2 within 1 min by means of the blower 3. The valves 10 and 11 are closed.

In a second step, the valves 12, 13 and 15 are opened and the portion of chopped glass fibres conveyed into the first portion 2a of the conveying pipe 2 in the first step is conveyed into the second portion 2b of the conveying pipe 2 within 20 sec by the conveying gas by means of pressure conveyance. Compressed air at room temperature is used as conveying gas. The pressure for the compressed air is built up by the blower 16. The valves 12 and 15 are closed, valve 13 remains open to supply the supplementary conveying gas line 4 with compressed air. In the case of incipient blockages or blockages occurring, the shut-off valves 6, which are connected to the supplementary conveying gas line 4 via short pieces of pipe 5, open. As a result, the conveyance of the charged portion of the chopped glass fibres is maintained downstream of the incipient blockage or the blockage occurring.

In a third step, valve 14 is opened. The charged portion of chopped glass fibres conveyed into the second portion 2b of the conveying pipe 2 in the second step is then conveyed by the compressed air through the second portion 2b of the conveying pipe 2 to the discharging point 8. The conveyance takes place within 2 min. The amount of compressed air is set to 200 m³/h under normal conditions, which corresponds to a velocity of gas in an empty pipe of about 5 m/s. Valve 14 is subsequently closed. At discharging point 8, a sample of glass fibres is taken to determine the bulk volume after the conveyance. The increase in bulk volume is calculated from the bulk volume before and after the conveyance. The results are shown in Table 2. In this table, the extractability of the corresponding glass fibre sizes can be taken from Table 1.

The results reveal that glass fibres with an extractability of the size greater than 85% (Comparative example 2(c)) have a relatively great increase in volume during the pneumatic conveyance, which makes their further processing more difficult. In the case of glass fibres with a lower extractability of the size, for example in the range from 40 to 50%, this increase in volume is significantly less. An even smaller increase in volume is exhibited by glass fibres with an extractability of the size of less than 40%. Finally, glass fibres with an extractability of the size of less than 25% exhibit a still lower increase in volume and consequently still better properties for further processing after pneumatic conveyance.

TABLE 2

| Example | Glass fibre | Bulk volume before conveyance | Bulk volume after conveyance | Increase in volume caused by conveyance [%] | % by weight of extracted size/% by weight of size [%] |
|---|---|---|---|---|---|
| 2a | PPG 3660 | 1.59 | 1.73 | 8.8 | 43 |
| 2b | Vetrotex 983 | 1.85 | 1.84 | −0.5 | 24 |
| 2c (Comparative example) | PPG 3786 | 1.54 | 2.01 | 31 | 90 |
| 2d | Bayer CS7928 | 1.79 | 1.88 | 5.2 | 39 |

What is claimed is:

1. A method of pneumatic conveyance, of glass fibres for increasing conveyance efficiency comprising:
   providing an apparatus having:
   (i) a conveying pipe with a shut-off device, which subdivides the conveying pipe into a first portion between a first end of the conveying pipe and the shut-off device and a second portion between the shut-off device and the second end of the conveying pipe,
   (ii) a charging device, which is connected to the first end of the conveying pipe by means of the shut-off device, (iii) a discharging device, which is connected to the second end of the conveying pipe,
iv) a pressure conveying device, which is connected to the first end of the conveying pipe via a shut-off device, and
(v) a suction conveying device, which is connected to the first portion of the conveying pipe via a shut-off device, and pneumatically conveying via said apparatus sized glass fibres which have a size extractability of at most 85% thereby conveying said glass fibres more efficiently.

2. The method according to claim 1, wherein the size extractability is at most 50%.

3. The method according to claim 1, further comprising transporting in bulk the sized glass fibres before the pneumatically conveying step.

4. The method according to claim 3, wherein the transporting takes place by means of bulk material containers of at least 1.5 t.

* * * * *